United States Patent [19]
Schmid et al.

[11] Patent Number: 5,950,129
[45] Date of Patent: Sep. 7, 1999

[54] TWO-WAY IN-FLIGHT RADIO TELECOMMUNICATION SYSTEM AND METHOD

[75] Inventors: Glen Schmid, Baie d'Urfe, Canada; Philip Wacker, Dallas, Tex.

[73] Assignee: Telefonaktiebolaget LM Ericsson (publ), Stockholm, Sweden

[21] Appl. No.: 08/762,134

[22] Filed: Dec. 9, 1996

[51] Int. Cl.$^6$ .............................. H04Q 7/20; H04Q 7/38
[52] U.S. Cl. .................... 455/431; 455/430; 455/445; 455/433; 455/12.1; 455/13.1
[58] Field of Search .................... 455/431, 12.1, 455/13.1, 561, 432, 430, 433, 435, 436, 437, 440, 575, 11.1, 445; 340/988, 989, 991, 994

[56] References Cited

U.S. PATENT DOCUMENTS

| | | | |
|---|---|---|---|
| 5,212,804 | 5/1993 | Choate | 455/431 |
| 5,278,891 | 1/1994 | Bhagat et al. | 379/58 |
| 5,408,515 | 4/1995 | Bhagat et al. | 379/59 |
| 5,559,865 | 9/1996 | Gilhousen | 455/431 |
| 5,702,070 | 12/1997 | Waid | 340/988 |
| 5,732,387 | 3/1998 | Armbruster et al. | 455/12.1 |

OTHER PUBLICATIONS

"USER GUIDE", Bell *Mobility* Skytel, pp. 1–8.

*Primary Examiner*—Wellington Chin
*Assistant Examiner*—Keith Ferguson
*Attorney, Agent, or Firm*—Smith & Danamraj, P.C.

[57] ABSTRACT

A system and method for providing two-way in-flight radio telecommunications on board an aircraft is disclosed. The radio telecommunication system includes a Gateway Mobile Switching Center (G-MSC), an Aircraft In-flight System Controller (AISC) located on board a subscriber's aircraft, a Ground In-flight System Controller (GISC), a satellite to relay messages and calls from the GISC and AISC, and a Home Location Register (HLR) which provides routing and location information for use by the GISC and the G-MSC. In an alternate embodiment of the invention, a system and method for using a mobile phone on an aircraft is disclosed. A mobile phone is connected to a seat terminal located on an aircraft by a co-ax cable. The radio frequency (RF) signals produced by a mobile phone pass through a coax cable to an Airborne Radio Base Station (A-RBS). The A-RBS converts the RF signals into signals which do not interfere with the aircraft's navigational and communication equipment and are compatible with the GISC and multiple cellular networks. These converted signals are then transmitted via satellite to a cellular network.

12 Claims, 5 Drawing Sheets

TWO-WAY IN-FLIGHT RADIO TELECOMMUNICATION SYSTEM AND METHOD

BACKGROUND OF THE INVENTION

1. Technical Field of the Invention

This invention relates to radio telecommunication systems and, more particularly, to a system and method for two-way in-flight radio telecommunications on board an aircraft.

2. Description of Related Art

Air-to-ground telecommunication systems on board aircraft are widely known and used. These in-flight systems typically provide a passenger with the ability to initiate a telephone call by contacting a ground-based station and connecting to the public switched telephone network (PSTN), and from there, to a called party.

However, existing in-flight telecommunication systems suffer from several disadvantages. First, a ground-based caller has no way of originating a call to a passenger on board an aircraft through an in-flight telephone system. Existing in-flight telephone systems do not permit incoming calls. The closest existing system to a two-way in-flight telephone system requires a ground-based caller to call a special airborne telephone number specific to an airborne passenger on a particular flight. The ground-based caller must input the ground-based telephone number where the call is being originated. If the airborne passenger has registered his location with the system, the airborne passenger receives a message indicating that the ground-based caller requests a call. The airborne party must then call back the ground-based caller.

Additionally, a passenger may not use his own mobile telephone on board an aircraft because the mobile telephone's radio frequency (RF) signal may interfere with aircraft operations. The passenger must use the telephone provided in the seat-back in front of him, and pay higher access fees associated with the existing in-flight system. Also, since the existing in-flight system does not allow the passenger to use his own mobile telephone, the passenger loses the benefits of many advanced features and services to which he may subscribe. Thus, when utilizing an existing in-flight telecommunication system, a passenger must pay higher fees while receiving less service than he obtains when using his own mobile telephone.

Although there are no known prior art teachings of a solution to the aforementioned deficiency and shortcoming such as that disclosed herein, prior art references that discuss subject matter that bears some relation to matters discussed herein are U.S. Pat. No. 5,278,891 to Bhagat et al. (Bhagat '891), U.S. Pat. No. 5,408,515 to Bhagat et al. (Bhagat '515), and U.S. Pat. No. 5,212,804 to Choate (Choate). Bhagat '891 discloses a ground-to-air telephone calling system for calling a subscriber on an aircraft with a single telephone. Specifically, the patent provides for a system for receiving a call while airborne in an aircraft. The system includes a ground-based computer for receiving a called airborne telephone number and a call-back number from an originating party on the ground. Bhagat '981 requires the originating party to input an Air-Ground Radiotelephone Automated Service (AGRAS) number, representing an identification number of the airborne telephone to be called. The originating party must then input a call-back number (i.e., his own telephone number) and then hang up. Subsequently, the system connects the two parties by calling the airborne party and then calling the originating party.

Thus, Bhagat '891 suffers from several disadvantages. This telephone system requires the originating party to enter an additional AGRAS number, as well as the originating party's own number. Furthermore, this system works with aircraft possessing only one airborne telephone, but not those aircraft possessing more than one telephone.

Bhagat '515 discloses a ground-to-air telephone calling system as discussed in Bhagat '891, but provides for ground-to-air calls to aircraft possessing more than one telephone. Bhagat '515 requires that an airborne subscriber be assigned and utilize a Traveler Assigned Number (TAN), which is associated with a particular seat on an airplane. Bhagat '515 suffers from the same disadvantages of Bhagat '891 associated with the requirements for the originating party to enter an AGRAS number, enter the originating party's own number, hang up, and wait for a call back from the system. Bhagat '515 then adds the additional complexity of requiring a TAN to be assigned to each passenger. This is a very burdensome task for airlines, and in any event, will not work on those airlines that do not assign specific seats to passengers.

Choate discloses an air-to-ground telephone system having multiple ground-based base stations and multiple airborne mobile units. Specifically, the patent provides for controlling multiple two-way radiotelephone conversations between a number of aircraft and a network of base stations capable of being interconnected to landline telephone networks. Choate, however, does not provide for ground-initiated calls to an airborne party.

It would be a distinct advantage to have a two-way in-flight telecommunication system and method of providing an airborne subscriber with the ability to originate and receive telephone calls in the aircraft at the subscriber's seat, such calls being made with subscribers on the ground or with other airborne subscribers. In addition, it would be advantageous for such a system to operate by utilizing the airborne subscriber's own mobile telephone without interfering with aircraft navigation or communication systems. It is an object of the present invention to provide such an in-flight telephone system and method.

SUMMARY OF THE INVENTION

The present invention is a system and method of providing two-way in-flight radio telecommunications on board an aircraft. In one aspect, the present invention is a radio telecommunication system providing two-way telephone services between an airborne subscriber located on board an aircraft and another party. The radio telecommunication system includes a gateway mobile switching center (G-MSC) and a ground in-flight system controller (GISC) for receiving and routing calls from the G-MSC to the aircraft, as well as from the aircraft to the G-MSC. The radio telecommunication system also includes a home location register (HLR) that stores subscriber information, routing information, and location information. The HLR receives the routing information and the location information from the GISC. The HLR also sends the subscriber information to the GISC and the routing information to the G-MSC. Finally the radio telecommunication system includes an aircraft in-flight system controller (AISC) located on the aircraft for connecting the airborne subscriber to the radio telecommunication system and for providing location and activity information for the subscriber to the GISC.

In another aspect, the present invention is a method of delivering a call from a party to an airborne subscriber located on board an aircraft. The method begins by updating the location and subscriber information of the airborne subscriber in its home location register (HLR). This is followed by receiving in a gateway mobile switching center (G-MSC), an incoming call for the airborne subscriber from the party. The method continues by transmitting a location request message requesting the routing information of the airborne subscriber from the G-MSC to the HLR. Next, the HLR transmits a routing request message to a ground in-flight system controller (GISC). This is followed by transmitting an availability query from the GISC to the AISC and querying, by the AISC, the availability of a seat telephone terminal where the airborne subscriber is located on board the aircraft. The method continues by transmitting an availability response indicating the availability of the seat telephone terminal from the AISC to the GISC. Next, the GISC allocates a routing number providing routing information of the seat telephone terminal and the subscriber information. This is followed by transmitting a routing number from the GISC to the HLR and transmitting the routing number from the HLR to the G-MSC. Finally the method ends with delivering the call.

In another embodiment of the present invention, the present invention is a radio telecommunication system providing two-way telephone service between an airborne subscriber located on board an aircraft and another party. The radio telecommunication system includes a gateway mobile switching center (G-MSC) and a ground in-flight system controller (GISC) located on the ground for receiving and routing calls from the G-MSC to the subscriber's aircraft, and from the aircraft to the G-MSC. The system also includes a home location register (HLR) that stores subscriber information, routing information, and location information. The HLR receives the routing information and the location information from the GISC. The HLR also sends the subscriber information to the GISC and the routing information to the G-MSC. The system also includes a mobile telephone for transmitting and receiving calls from the airborne subscriber to the radio telecommunication system through the GISC. Finally, the system includes an airborne radio base station (A-RBS) located on board the aircraft for converting RF signals produced by the mobile telephone to a protocol compatible with the GISC, and a co-ax cable connecting the mobile telephone to the A-RBS.

In another aspect, the present invention is a method of using a mobile telephone on an aircraft. The method starts by connecting a co-ax cable from the mobile telephone to a airborne radio base station (A-RBS) and converting by the A-RBS the radio frequency (RF) signals produced by the mobile telephone into a compatible protocol which does not interfere with the aircraft's operations. This is followed by transmitting in the A-RBS, signals in the compatible protocol from the A-RBS to the GISC and the routing of the signals from the GISC to the G-MSC via the HLR. Finally, the method finishes with delivering the signals from the G-MSC to another party.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

The present invention is a system and method for two-way in-flight radio telecommunications on board an aircraft.

Figure 1:
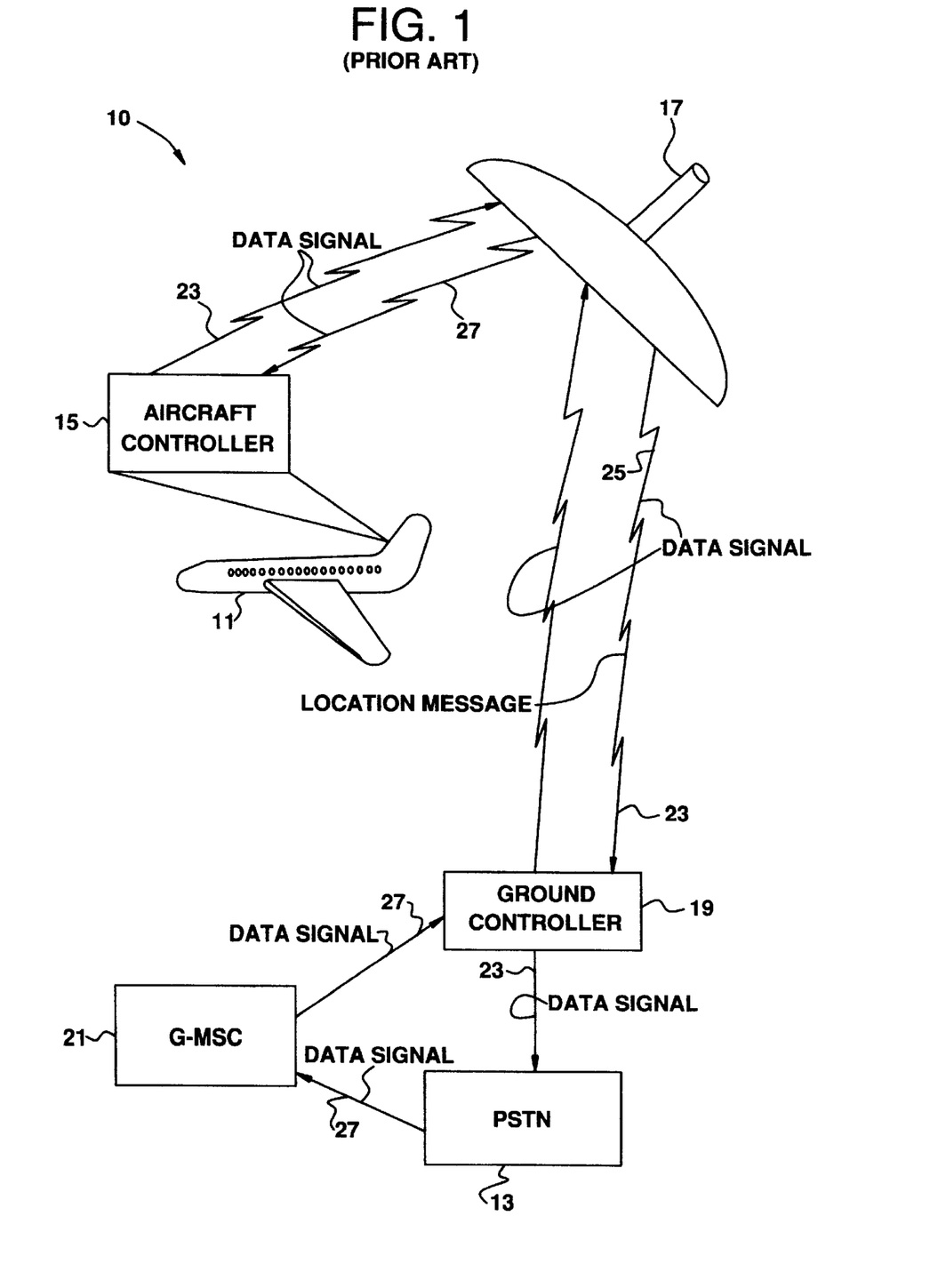
FIG. 1 (Prior Art) is a simplified block diagram illustrating an existing in-flight telephone system which utilizes an Aircraft Controller, a Ground Controller, a satellite and a Gateway Mobile Switching Center (G-MSC)

FIG. 1 is a simplified block diagram illustrating an existing in-flight telephone system 10 for connecting calls from a passenger on an aircraft 11 with a called party in the public switched telephone network (PSTN) 13. The existing in-flight system 10 includes an Aircraft Controller 15, a satellite 17, a Ground Controller 19 and a Gateway Mobile Switching Center (G-MSC) 21. A call is initiated by the passenger on the aircraft 11. The call is routed through the Aircraft Controller 15, which is located on the aircraft 11, and uplinked to a satellite 17 through a data signal 23. Data signal 23 is subsequently downlinked to the Ground Controller 19, which is located on the ground. Ground Controller 19, after receiving data signal 23, routes the signal to the PSTN 13. Finally, the call is routed from the PSTN 13 to the ground-based party. However, in the existing system, there is no way for a party to initiate a telephone call to an airborne passenger. The existing system 10 requires the passenger to input at his seat terminal, a special airborne telephone number. A location message 25 is sent by the Aircraft Controller 15 to the Ground Controller 19 via satellite 17. Subsequently, in order for the party to establish contact with the passenger, the ground-based party must input the ground-based party's telephone number as well as a special airborne telephone number associated with the passenger. The PSTN 13 recognizes the special airborne telephone number and routes a data signal 27 to the G-MSC 21. The G-MSC 21 sends the data signal 27 to the Ground Controller 19. The data signal 27 is sent to the Aircraft Controller 15 via satellite 17. The Aircraft Controller 15 informs the airborne passenger of the ground-based party's telephone number. If the airborne passenger wishes to speak with the ground-based party, the airborne passenger must initiate a call back to the ground-based party.

Figure 2:
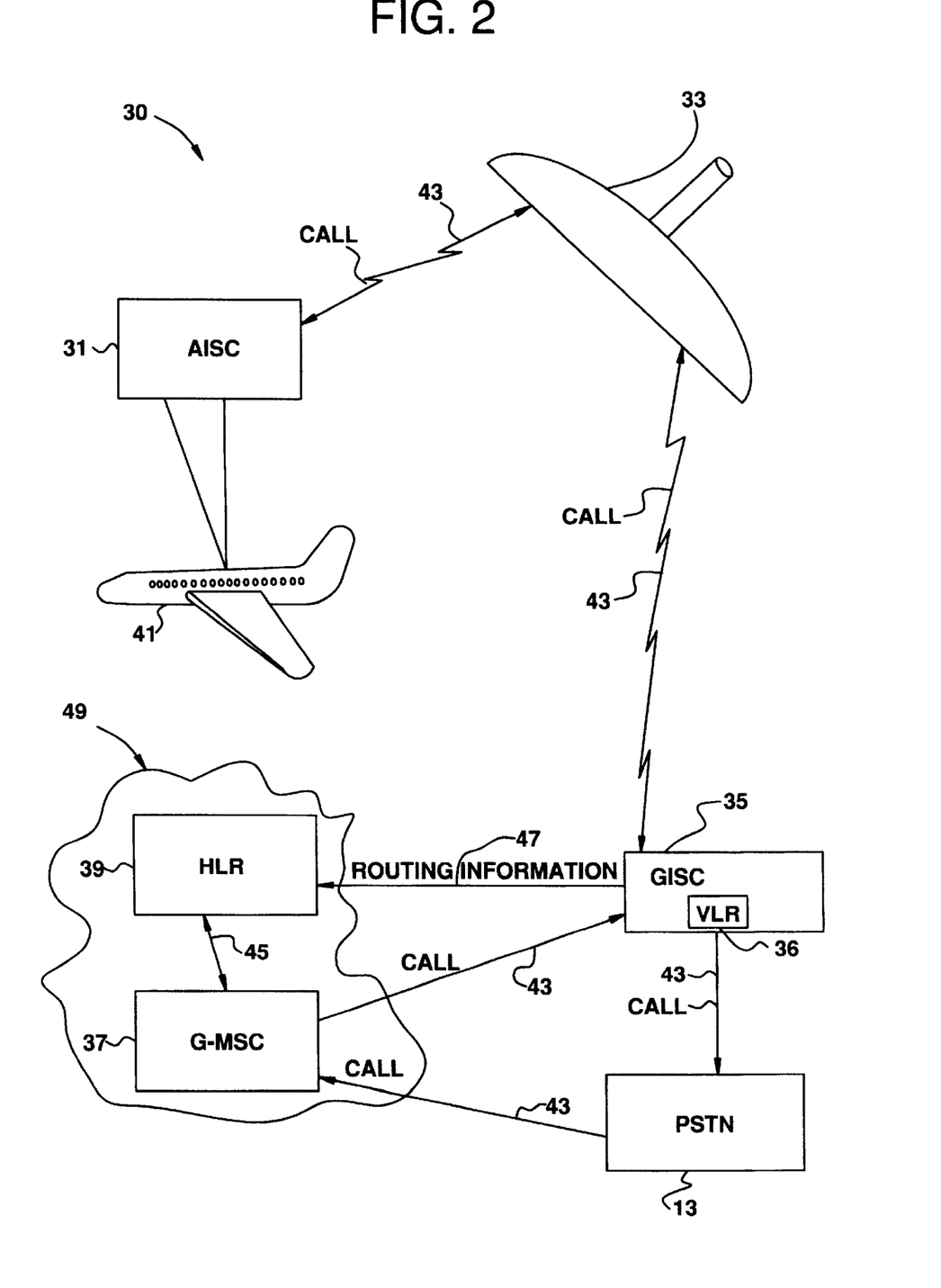
FIG. 2 is a simplified block diagram illustrating the components of an in-flight telephone system of the present invention.

FIG. 2 is a simplified block diagram illustrating the components of an in-flight telephone system 30 of the present invention. In the preferred embodiment of the present invention, the telephone system 30 includes an Aircraft In-flight System Controller (AISC) 31, a satellite 33, and a signaling network 49 further comprising a Ground In-flight System Controller (GISC) 35, a G-MSC 37, and a Home Location Register (HLR) 39.

The AISC 31 is located on board an aircraft 41. The AISC stores in memory the telephone location where a subscriber is located on board the aircraft 41. In order to establish the location of the subscriber on the airplane 41, a credit card can be used as a smart card. The subscriber boards the aircraft 41 and runs his smart card through a card reader located at the telephone terminal where the subscriber is located. A PSTN-dialable number called a Calling Card Number (CCN) is associated with the smart card. The smart card is similar to a Subscriber Identity Module (SIM) card found in GSM. The smart card enables the airborne subscriber to use the associated CCN aboard the aircraft 41.

This CCN may be the subscriber's mobile telephone number. Alternately, the subscriber can manually enter his CCN into the telephone terminal. The AISC 31 informs the GISC 35 of the location of the subscriber on board the aircraft 41 through location updating messages. Additionally, the AISC 31 informs the GISC 35 when the AISC 31 can no longer receive calls (i.e. at the termination of the flight).

A signaling network 49 found in most radio telecommunications network, such as SS7 networks, is used for communicating between the components within the signaling network 49, the G-MSC 37 and the HLR 39, and the GISC 35.

The GISC 35 is located on the ground and provides a conduit between the airborne subscriber and another party, based either on the ground or in the air. The GISC 35 includes a Visitor Location Register (VLR) 36, which stores the location of the airborne subscriber on board the aircraft 41. The VLR 36 also stores the subscriber's categories and routing information. The VLR 36 receives the routing and location information from the AISC 31. The GISC 35 provides routing information 47 on the airborne subscriber to the HLR 39 when the HLR 39 requests the information. The GISC 35 also cancels the routing information sent to the HLR 39 when informed of the termination of the flight by the AISC 31.

The ground-based HLR 39 is a database found in most cellular systems. The HLR 39 stores the CCN, as well as location, routing and availability information of the subscriber. The HLR 39 obtains the location, routing and availability information of the subscriber by sending queries to the GISC 35. The HLR 39 receives requests for routing information from the G-MSC 37 and sends the results to the G-MSC 37.

The satellite 33 allows the GISC 35 to communicate with the AISC 31 by relaying any messages and establishing a communications link for a call 43.

When a subscriber boards an aircraft 41 and passes his smart card through the card reader located in the phone at the subscriber's seat, the AISC 31 stores the CCN and the location of the subscriber in its memory. The AISC 31 informs the GISC 35 of the presence, location and CCN of the airborne subscriber by sending a location updating message to the GISC 35 via satellite 33. The GISC 35 updates the HLR 39, from information obtained from the AISC 31, by sending routing information 47 to the HLR 39. In addition, the GISC 35 stores the subscriber's categories in the VLR when received from the HLR 39. Whenever the CCN is dialed by an originating party in the PSTN 13, the call 43 is routed through the G-MSC 37, as in a typical cellular network. When the originating party is based aboard another aircraft, its GISC acts as a G-MSC. When the call reaches the G-MSC 37, the G-MSC 37 queries the HLR 39, associated with the CCN, for the airborne subscriber's status and location, by sending a location request message 45, using a global title defined as the CCN. The HLR 39 looks up the subscriber status and, if the airborne subscriber's status is active, the HLR 39 orders the G-MSC 37 to reroute the call 43 to the GISC 35. The GISC 35 then uplinks the call 43 to the satellite 33. The call 43 is subsequently downlinked to the AISC 31 on board the aircraft 41. The AISC 31 then routes the call 43 to the airborne subscriber's location on the aircraft 41. Additionally, the subscriber can still originate a call 43 from the aircraft 41 via satellite 33 to the GISC 35, and from there, to the PSTN 13.

Figure 3:
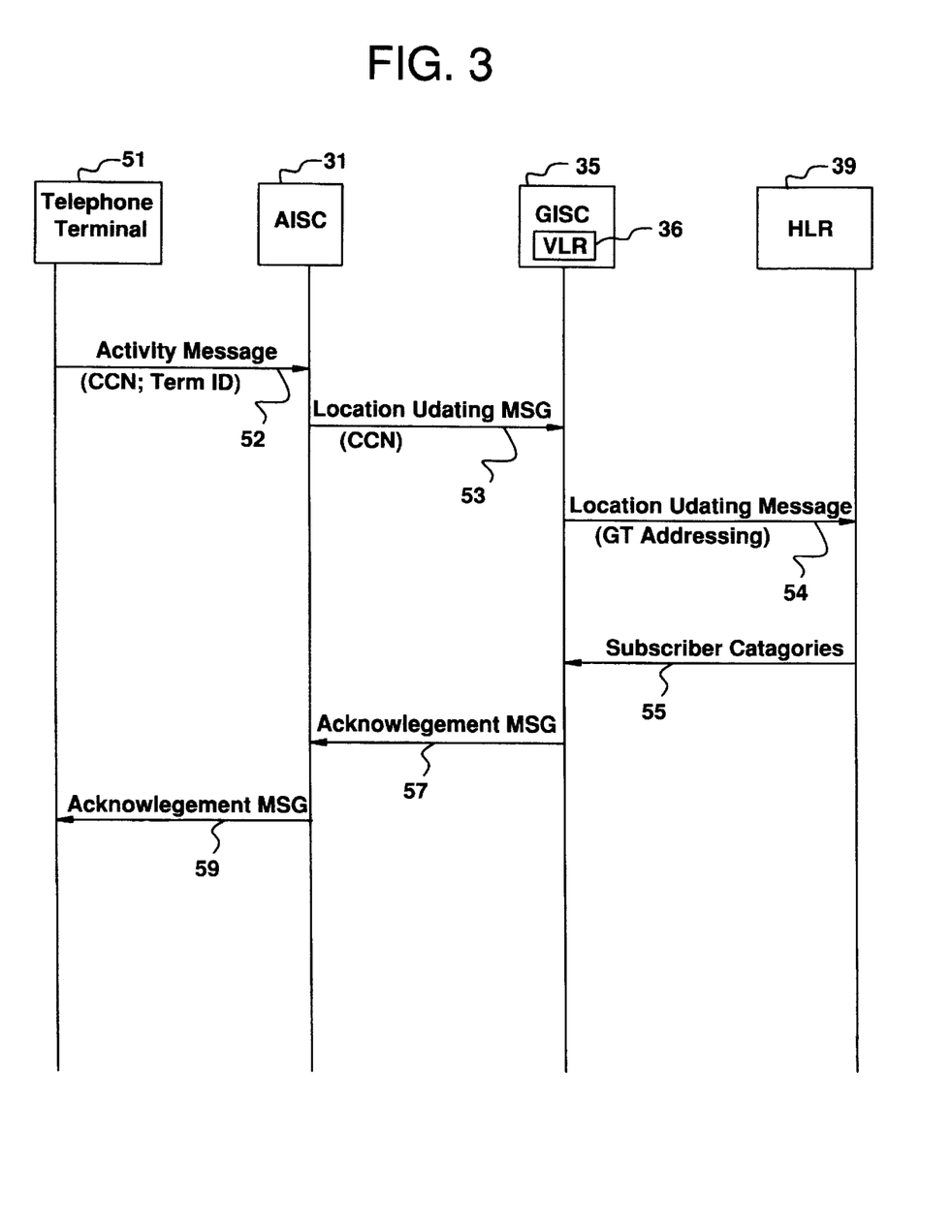
FIG. 3 is a signaling diagram illustrating the flow of messages for updating a subscriber's address in the present invention.

FIG. 3 is a signaling diagram illustrating the flow of messages for updating a subscriber's address in the HLR 39 according to the teachings of the present invention. The process begins when a subscriber boards an aircraft and runs his smart card through a card reader located in a telephone terminal 51 at the subscriber's seat. The data from the smart card includes the subscriber's CCN. An activity message 52 is sent from the terminal 51 to the AISC 31 and includes the subscriber's CCN and terminal number. The AISC 31 stores the CCN and the terminal number defining the location of the subscriber's telephone. The AISC 31 then sends a location updating message 53 to the VLR 36 in the GISC 35. The VLR 36 creates a visitor record, stores the CCN, an aircraft identifier, and the terminal number in the visitor record. Next, the GISC 35 sends a location updating message 54 to the HLR 39 using Global Title (GT) addressing. The HLR 39 records the VLR 36 address in the subscriber's record and marks the subscriber's record as active. The HLR 39 then sends the relevant subscriber categories 55 back to the GISC 35 where they are stored in the subscriber's record in the VLR 36 along with the HLR 39 address. The GISC 35 may send an acknowledgment message 57 to the AISC 31 acknowledging completion of the updating of the subscriber's address in the HLR 39. Next, the AISC 31 may send an acknowledgment message 59 to the telephone terminal 51 acknowledging completion of the updating of the subscriber's address in the HLR 39.

Figure 4:
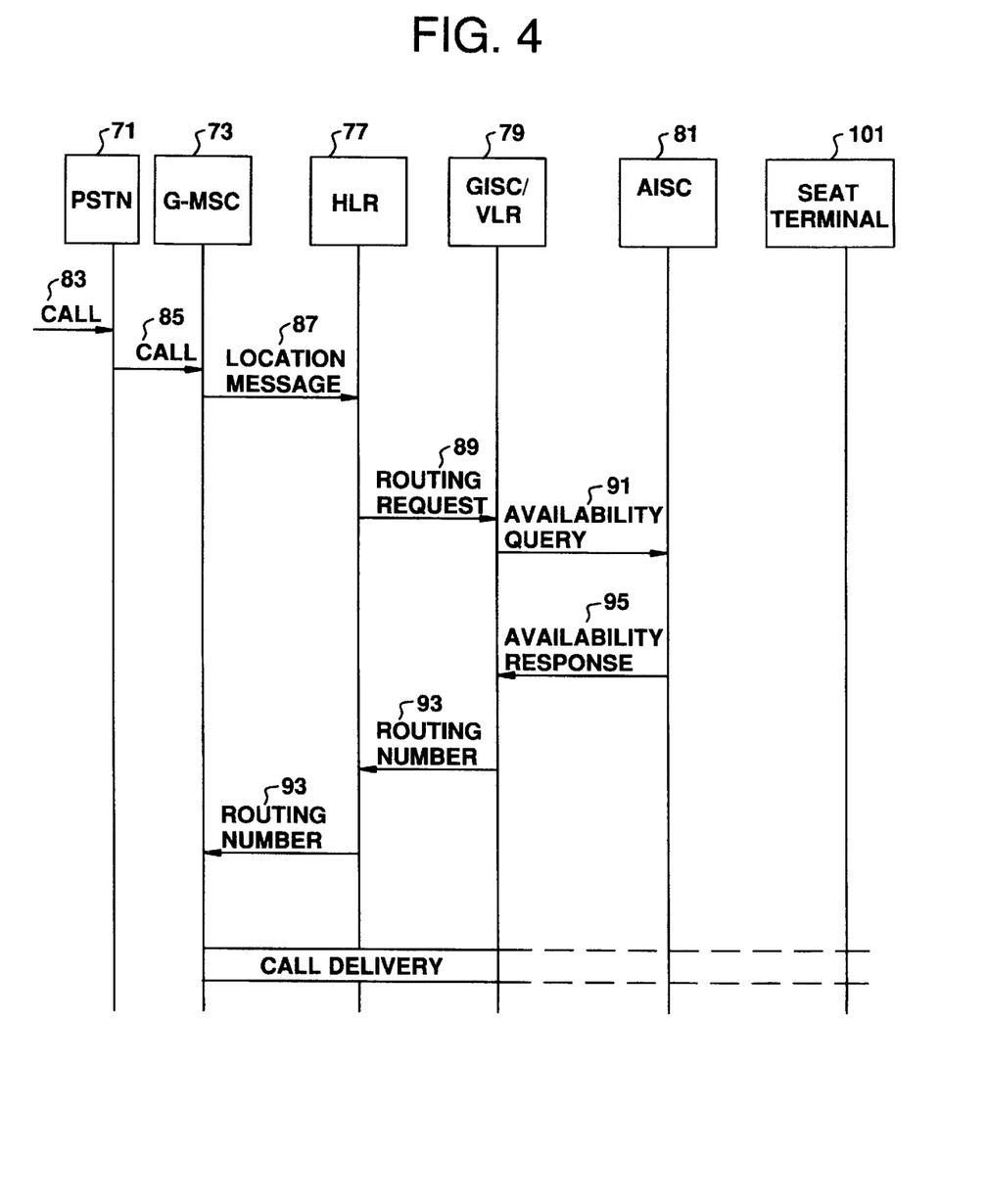
FIG. 4 is a signaling diagram illustrating the routing of a call from a party to an airborne subscriber in accordance with the teachings of the present invention.

FIG. 4 is a signaling diagram illustrating the routing of a call from a ground-based or airborne (originating) party to an airborne subscriber in accordance with the teachings of the present invention. When the originating party dials an airborne subscriber's CCN, the call 83 is recognized by the PSTN 71 as a wireless number, and at 85, the call is routed to the nearest G-MSC 73. The G-MSC 73 creates a location request message which may take the form of a location message 87, uses the CCN as a GT, and sends it out to the subscriber's HLR 77. The HLR 77 checks its database to see if the called party is active and currently registered in the VLR located in the GISC 79. If the subscriber is active, the HLR 77 sends a routing request 89 to the GISC 79. The GISC 79 sends an availability query 91 to the AISC 81 on board the subscriber's aircraft, to determine if the terminal at which the subscriber is located is available. The AISC 81 sends an availability response 95 back to the GISC 79. If the terminal is available, the GISC 79 allocates a routing number 93 providing routing information of the terminal and the subscriber's information. The GISC 79 sends the routing number 93 to the HLR 77 associated with the subscriber's record. The routing number 93 is a valid PSTN number terminating at the GISC 79. The HLR 77 forwards the routing number 93 to the G-MSC 73. Call delivery is then completed from the G-MSC 73 to the GISC 79. The GISC 79 determines the location of the subscriber for the call 83. Additionally, the GISC 79 determines the availability of the subscriber for the call 83. The GISC 79 then forwards the call to the AISC 81. The AISC 81 sends an alerting signal to a seat terminal 101 where the subscriber is located. The alerting signal may cause a light to flash or a ringer to ring at the seat terminal 101. When the airborne subscriber answers, the call is connected.

Figure 5:
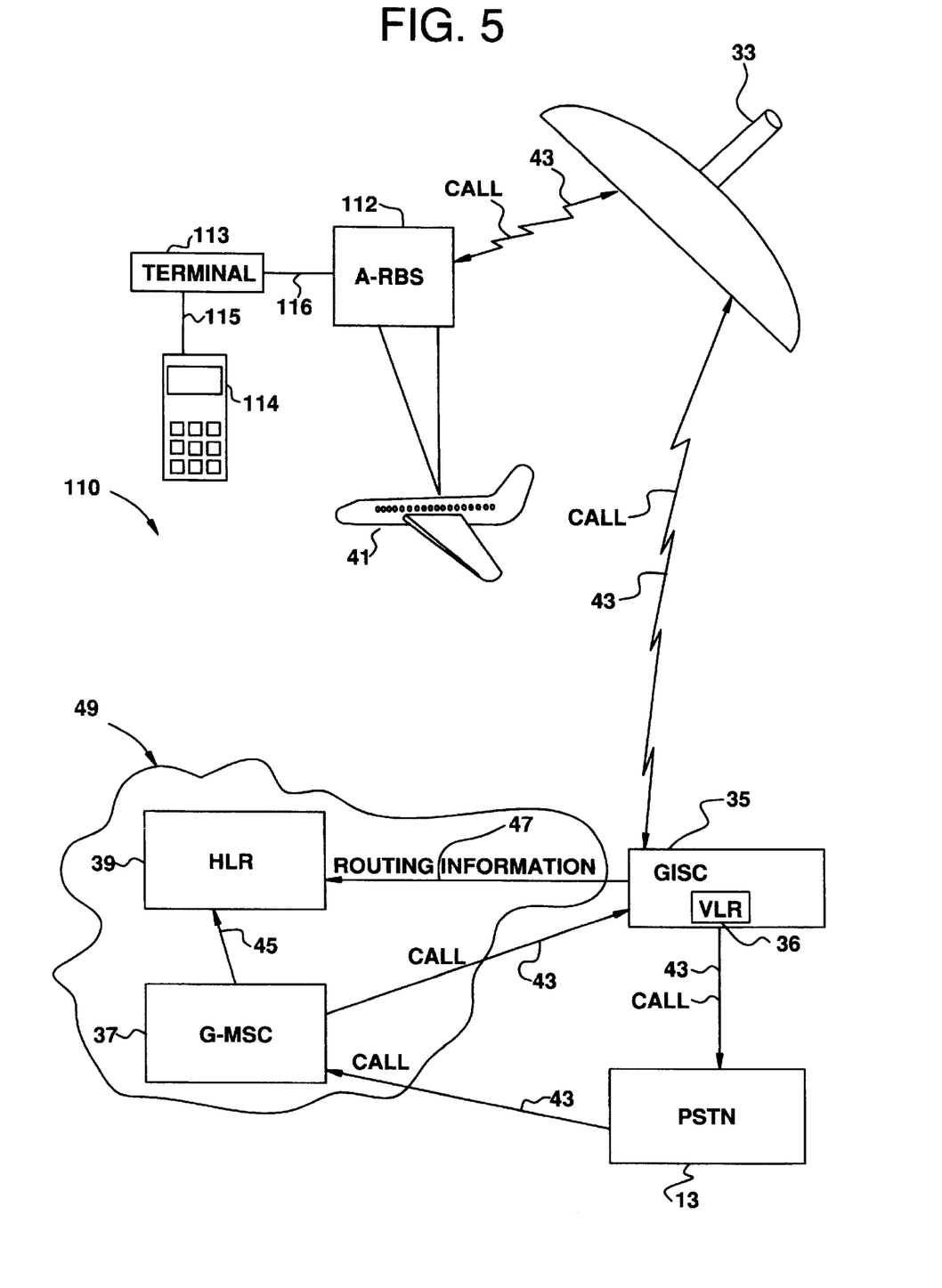
FIG. 5 is a simplified block diagram illustrating the components of an in-flight telephone system of an alternate embodiment of the present invention.

FIG. 5 is a simplified block diagram illustrating the components of an in-flight telephone system 110 of an alternate embodiment of the present invention. In the alternate embodiment of the present invention, the telephone system 110 includes an Airborne Radio Base Station (A-RBS) 112, a satellite 33, a telephone terminal 113, a mobile telephone 114, a first co-ax cable 115, a second co-ax cable 116, a GISC 35, and a signaling network 49 further comprising a G-MSC 37 and a HLR 39.

The telephone system 110 is the same as telephone system 30, except for some differences located aboard aircraft 41. An A-RBS 112 is used in place of an AISC aboard the aircraft 41. The A-RBS 112 performs all of the same functions as the AISC 31 as described in the telephone system 30. However, the A-RBS 112 has the additional function of converting all of the RF signals produced by the mobile telephone 114, to a signalling protocol compatible with the GISC 35, which will not interfere with the aircraft's operations. The mobile telephone 114 is an ordinary mobile phone typical of use in a cellular telecommunication system with an added modification of a co-ax connector. The mobile telephone 114 is located with the airborne subscriber at a telephone terminal 113 at a seat location on board aircraft 41.

The first co-ax cable 115 connects the mobile telephone 114 to the telephone terminal 113 through the coax connector. The first co-ax cable 115 provides an insulated connection for the RF signal produced by the mobile telephone 114 wherein the RF signals do not interfere with the operations of the aircraft 41.

The second co-ax cable 116 runs from the telephone terminal 113 at the airborne subscriber's seat to the A-RBS 112. The second co-ax cable 116 also provides an insulated connection for the RF signal produced by the mobile telephone 114 from the telephone terminal to the A-RBS 112 and again prevents the RF signals from interfering with the operations of the aircraft 41.

The airborne subscriber connects his mobile telephone 114 to the telephone terminal 113 at his seat by using the first co-ax cable 115. The airborne subscriber then initiates a call to a ground-based party. The RF signal produced by the mobile telephone 114 proceeds through the first co-ax cable 115 to the telephone terminal 113. Next, the RF signal passes from the telephone terminal to the A-RBS 112 through the second co-ax cable 116. Once the RF signal reaches the A-RBS 112, the A-RBS 112 converts the RF signals into a protocol compatible with the GISC 35 and which does not interfere with the aircraft 41's operations. This protocol is then transmitted via satellite 33 to the GISC 35. Once the GISC 35 receives the signals from the satellite 33, the telephone system 110 functions in the same manner as described for the telephone system 30. It is thus believed that the operation and construction of the present invention will be apparent from the foregoing description. While the system shown and described has been characterized as being preferred, it will be readily apparent that various changes and modifications could be made therein without departing from the spirit and scope of the invention as defined in the following claims.

What is claimed is:

1. In a radio telecommunication system having a gateway mobile switching center (G-MSC), a ground in-flight system controller (GISC) with a visitor location register (VLR), an aircraft in-flight system controller (AISC) on board an aircraft, and a home location register (HLR), a method of delivering a call from a party to an airborne subscriber located on board said aircraft, said method comprising the steps of:

updating location and subscriber information of said airborne subscriber in said HLR and in said VLR;

receiving in said G-MSC, an incoming call for said airborne subscriber from said party;

transmitting a location request message from said G-MSC to said HLR, said location request message requesting routing information for said airborne subscriber;

transmitting from said HLR to said GISC a routing request message;

transmitting an availability query from said GISC to said AISC;

querying, by said AISC, the availability of a seat telephone terminal where said airborne subscriber is located on board said aircraft;

transmitting an availability response from said AISC to said GISC, said availability response indicating the availability of said seat telephone terminal;

allocating a routing number in said GISC, said routing number providing routing information for said telephone terminal and said information of said airborne subscriber;

transmitting said routing number from said GISC to said HLR;

transmitting said routing number from said HLR to said G-MSC; and delivering said call.

2. The method of claim 1 further comprising, after the step of updating location and subscriber information of said airborne subscriber in said HLR, the steps of:

transmitting a location updating message from said AISC to said VLR;

transmitting said location updating message from said VLR to said HLR; and transmitting said airborne subscriber's categories from said HLR to said VLR.

3. The method of claim 2 further comprising, after the step of transmitting said airborne subscriber's categories from said HLR to said VLR, the steps of:

sending an acknowledgment message from said GISC to said AISC acknowledging the completion of updating said location and subscriber information of said airborne subscriber in said HLR; and sending an acknowledgment message from said AISC to said seat telephone terminal acknowledging the completion of updating said location and subscriber information of said airborne subscriber in said HLR.

4. The method of claim 3 wherein said step of delivering said call includes the steps of:

routing said incoming call from said G-MSC to said GISC;

determining said location and availability of said airborne subscriber for said incoming call by said GISC;

forwarding said incoming call to said AISC of said airborne subscriber from said GISC; and sending an alerting signal from said AISC to said telephone terminal.

5. A radio telecommunication system providing two-way telephone services between an airborne subscriber located on board a first aircraft and another party, comprising:

a gateway mobile switching center (G-MSC);

a ground in-flight system controller (GISC) located on the ground for receiving and routing calls from said G-MSC to said first aircraft, and from said first aircraft to said G-MSC;

a home location register (HLR) that stores subscriber information, routing information, and location information, said HLR receiving said routing information and said location information from said GISC, and said HLR sending said subscriber information to said GISC and said routing information to said G-MSC;

a mobile phone for transmitting and receiving calls from said airborne subscriber to said radio telecommunication system through said GISC;

an airborne radio base station (A-RBS) located on board said first aircraft for converting RF signals produced by said mobile telephone to a compatible protocol for said GISC, said A-RBS connecting said airborne subscriber to said radio telecommunication system and providing location and activity information of said subscriber to said GISC; and a co-ax cable connecting said mobile telephone to said A-RBS.

6. The radio telecommunication system of claim 5 further comprising at least one satellite providing a signaling relay means from said A-RBS to said GISC.

7. The radio telecommunication system of claim 6 wherein said GISC includes a visitor location register (VLR) for storing said airborne subscriber's activity and location information.

8. The radio telecommunication system of claim 7 wherein said VLR also stores said airborne subscriber's categories.

9. The radio telecommunication system of claim 8 wherein said party originates a call to said airborne subscriber from on board a second aircraft, said radio telecommunication system further comprising a second GISC, said second GISC being associated with said second aircraft and performing the functions of said G-MSC for calls originated by said party and directed to said airborne subscriber.

10. In a radio telecommunication system having a ground in-flight system controller (GISC) with a visitor location register (VLR), an airborne radio base station (A-RBS), a co-ax cable connecting a mobile phone of an airborne subscriber with said A-RBS, and a signaling network having a home location register (HLR) and a gateway mobile switching center (G-MSC), a method of using said mobile telephone on said aircraft, said method comprising the steps of:

connecting said co-ax cable from said mobile telephone to said A-RBS;

converting, in said A-RBS, radio frequency (RF) signals generated from said mobile telephone into a protocol compatible with said GISC and said signaling network, and which does not interfere with operations of said aircraft;

transmitting in said A-RBS, signals in said compatible protocol, from said A-RBS to said GISC;

routing said signals from said GISC to said G-MSC via said HLR; and delivering said signals from said G-MSC to another party.

11. The method of claim 10 wherein said step of connecting a co-ax cable from said mobile telephone to said A-RBS includes the steps of:

connecting a first co-ax cable from said mobile telephone to a seat terminal on said aircraft; and connecting a second coax cable from said seat terminal to said A-RBS.

12. The method of claim 10 further comprising, after the step of converting RF signals into said compatible protocol, the step of transmitting via a satellite, said signals to a ground-based cellular network.

* * * * *